US012505502B2

(12) United States Patent
Agrawal et al.

(10) Patent No.: US 12,505,502 B2
(45) Date of Patent: Dec. 23, 2025

(54) OBJECT INTERFERENCE REDUCTION IN A MULTI-CAMERA SYSTEM

(71) Applicant: MOTOROLA MOBILITY LLC, Wilmington, DE (US)

(72) Inventors: Amit Kumar Agrawal, Bangalore (IN); Rahul Bharat Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 411 days.

(21) Appl. No.: 18/323,588

(22) Filed: May 25, 2023

(65) Prior Publication Data

US 2024/0394831 A1    Nov. 28, 2024

(51) Int. Cl.
| | | |
|---|---|---|
| *G06K 9/32* | (2006.01) | |
| *G06T 3/40* | (2006.01) | |
| *G06T 7/70* | (2017.01) | |
| *G06T 7/90* | (2017.01) | |
| *G06V 10/26* | (2022.01) | |
| *G06V 10/74* | (2022.01) | |
| *H04N 23/69* | (2023.01) | |

(52) U.S. Cl.
CPC .......... *G06T 3/40* (2013.01); *G06T 7/70* (2017.01); *G06T 7/90* (2017.01); *G06V 10/26* (2022.01); *G06V 10/761* (2022.01); *H04N 23/69* (2023.01); *G06T 2207/10024* (2013.01); *G06V 2201/07* (2022.01)

(58) Field of Classification Search
CPC .... G06T 3/40; G06T 7/70; G06T 7/90; G06T 2207/10024; G06V 10/26; G06V 10/761; G06V 2201/07; H04N 23/69
See application file for complete search history.

(56) References Cited

U.S. PATENT DOCUMENTS

2021/0344843 A1* 11/2021 Zhu .................. H04N 23/635
2022/0350925 A1* 11/2022 Alexander ............ H04W 12/02

* cited by examiner

*Primary Examiner* — Duy M Dang
(74) *Attorney, Agent, or Firm* — Isidore PLLC

(57) ABSTRACT

A method provides techniques for reducing object interference in a multi-camera system. The method includes selecting, by at least one processor of an electronic device, a first image capturing device having a first field of view (FOV) and that produces first image content. In response to detecting a partial occlusion of the first image capturing device by an object while the first image capturing device is receiving first image content, the at least one processor determines a zoom factor sufficient to remove the object from the received first image content. The processor then performs a zoom operation, based on the zoom factor, such that the object causing the partial occlusion of the first image capturing device is removed from subsequently received image content.

20 Claims, 9 Drawing Sheets

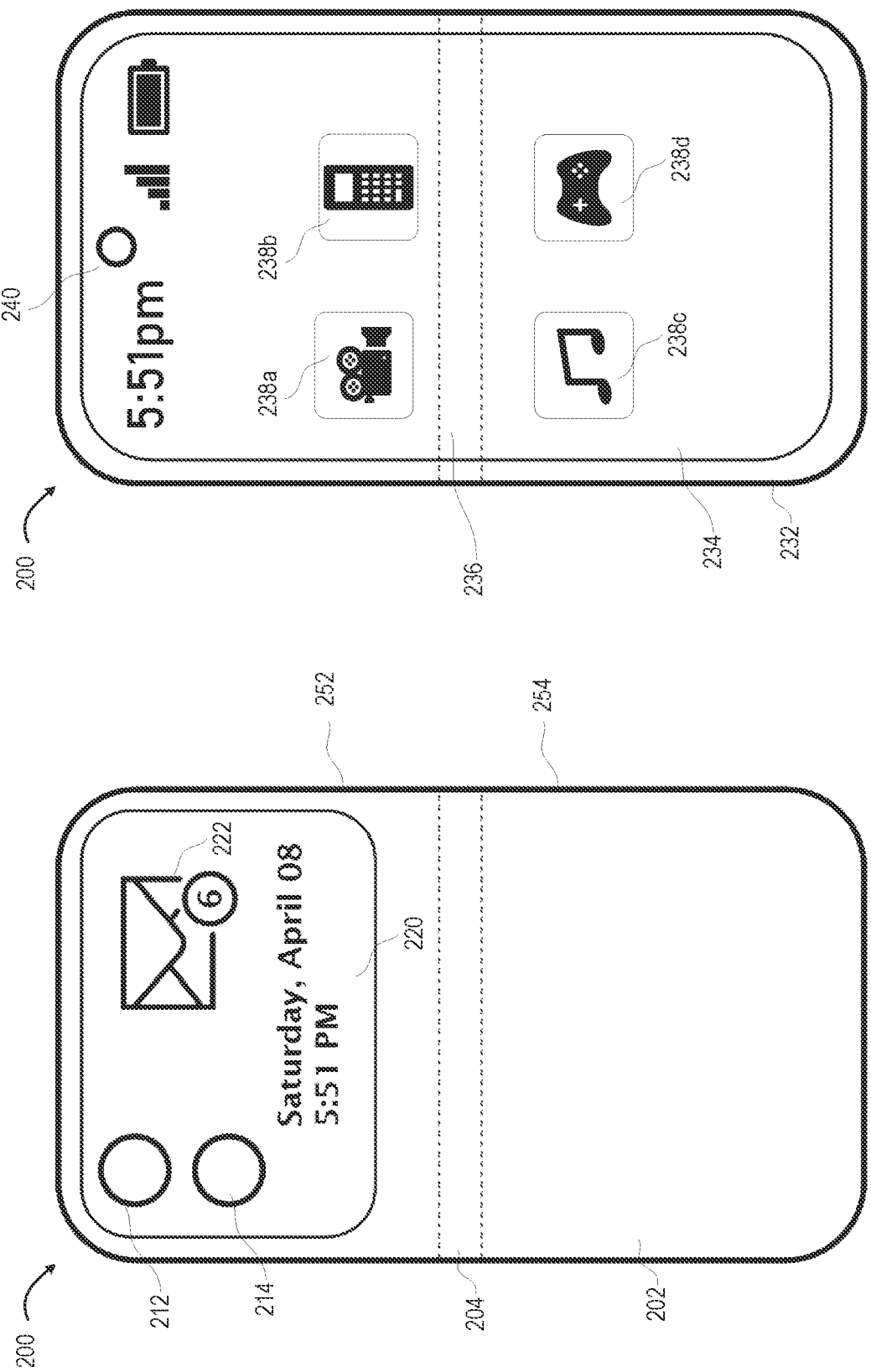

OBJECT INTERFERENCE REDUCTION IN A MULTI-CAMERA SYSTEM

BACKGROUND

1. Technical Field

The present disclosure generally relates to portable electronic devices, and more specifically to portable electronic devices that include multiple image capture devices.

2. Description of the Related Art

Modern smartphones and tablet computers are electronic devices that are equipped with high-resolution displays, as well as integrated digital cameras that capture high quality still pictures and videos. Most modern smartphones have at least two image capturing devices (cameras), with some models having three or more cameras. The cameras found in smartphones are typically small and compact, designed to fit within the slim profile of the device.

The cameras found on a smartphone or tablet computer can include a wide-angle camera. This type of camera has a wide field of view and is used for capturing landscapes, group photos, and architecture. Additionally, smartphones and tablets may include a telephoto camera. The telephoto camera has a narrower field of view than a standard camera and is used for zooming in on distant objects. Smartphones and tablets can further include an ultra-wide camera. The ultra-wide camera has an even wider field of view than a standard wide-angle camera, allowing for even more of the scene to be captured in a single photo. Some devices may include a macro camera, which can be used for capturing extreme close-up shots of small objects such as flowers, insects, or jewelry. Modern smartphones conventionally include one or more cameras mounted on or under a first side of the device and one or more cameras mounted on an opposite side from the other cameras, to enable self-portraits (selfies) and support of video calls and video conferencing. Thus, a modern smartphone can provide a user with multiple cameras to choose from for taking a photograph or video.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2A is a diagram illustrating a first surface of an example electronic device, configured as a flip phone with a display and cameras integrated within a top housing portion of the device, according to one or more embodiments;

FIG. 2B is a diagram illustrating a second surface of the example electronic device of FIG. 2A, presenting a flexible display and camera, according to one or more embodiments;

DETAILED DESCRIPTION

Figure 1:
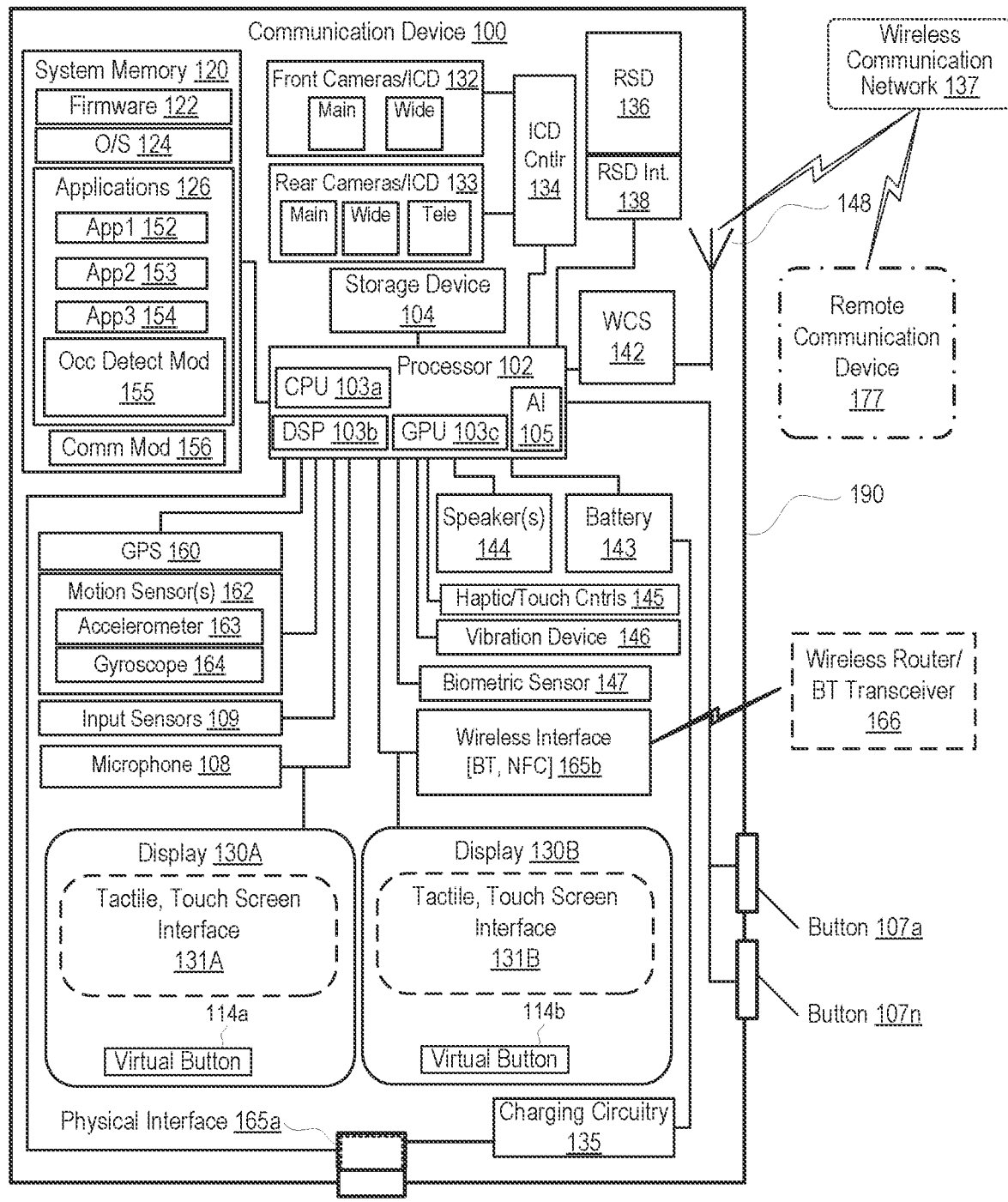
FIG. 1 depicts an example component makeup of an electronic device with a multi-camera system that can be configured to reduce object interference in images captured using the multi-camera system, according to one or more embodiments.

According to different aspects of the disclosure, an electronic device, various methods, and computer program products enable reducing object interference in a multi-camera system. An electronic device, such as a smartphone, tablet computer, or other suitable device, includes an enclosure that has a first surface and a second surface opposed to the first surface. The electronic device includes at least a first image capturing device (camera) disposed in at least the first surface. A controller within the electronic device selects the first image capturing device as an active image capturing device. In response to detecting a partial occlusion of the first image capturing device by an object, while the first image capturing device is receiving first image content, the controller determines a zoom factor sufficient to remove the object from the received first image content. The controller then performs a zoom operation on a lens of the first image capturing device, based on the zoom factor, whereby the object causing the partial occlusion of the first image capturing device is removed from subsequently received image content.

Traditionally, a handheld communication device (electronic device) such as a smartphone includes a single front-facing 'selfie' camera, and may include one or more rear-facing cameras, which are typically used by the user to take photographs of other objects. However, advancements in handheld electronic devices, such as manufacturing the devices as foldable devices with flexible front displays and smaller rear displays, have enabled configurations that allow a user to take a selfie using the rear-facing cameras. The multiple rear-facing cameras are typically of higher quality than the single front-facing (user-facing) camera typically found on a conventional smartphone, and can include a wide-angle camera and/or an ultra-wide-angle camera. In one or more embodiments, the wide-angle camera has a field-of-view (FOV) ranging from 70 degrees to 90 degrees, and the ultra-wide-angle camera has a field-of-view (FOV)

ranging from 90 degrees to 105 degrees. These wide-angle and ultra-wide-angle cameras are well-suited for taking self-photographs of groups, and/or capturing landscapes and other scenery behind the user. Therefore, it is desirable to use these cameras for such photographs. However, one disadvantage of using these cameras is that, due to the wide field-of-view (FOV) of these cameras, the image content captured by the cameras can often include a portion of the user's hand and/or arm in the image content. The portion of the user's hand and/or arm acts as a partial occlusion, which is often undesirable to have in a photograph.

The disclosed embodiments address the aforementioned problems associated with encountering a partial occlusion when taking self-photos using a camera that has a zoom function or an ultra-wide-angle camera or wide-angle camera in a device having multiple cameras with varying angles of field of views. Disclosed embodiments involve detecting a partial occlusion, such as a portion of a user's hand and/or arm, in the field of view of the camera, computing a zoom factor such that, when performing a zoom operation based on the zoom factor, the partial occlusion is removed from the field-of-view, thereby providing an improved user experience. The zoom factor is a measure of how much zoom is needed in order to remove the partial occlusion from the field of view.

In one or more embodiments, a multi-camera zoom operation is performed to zoom in on a subject, effectively cropping out a partial occlusion, such as a user's hand and/or arm. Image content can be obtained from a first image capturing device to obtain first image content, where the first image content includes a partial occlusion. The controller may then switch the active image capturing device to a second image capturing device, where the second image capturing device has a smaller FOV than the first image capturing device. As an example, the first image capturing device can have a FOV ranging from 90 degrees to 105 degrees, and the second image capturing device can have a FOV ranging from 70 degrees to 90 degrees. To perform the multi-camera zoom operation such that the partial occlusion is removed from image content, disclosed embodiments can switch the active image capturing device.

According to a first described aspect of the disclosure, there is provided an electronic device that includes an enclosure that includes a first surface and a second surface, opposed to the first surface. The electronic device includes at least one image capturing device comprising a first image capturing device having a first field of view (FOV) and that produces first image content. The electronic device includes a controller communicatively coupled to the first image capturing device, and which: activates the first image capturing device as an active image capturing device; and in response to detecting a partial occlusion of the first image capturing device by an object, while the first image capturing device is receiving first image content: determines a zoom factor sufficient to remove the object from the received first image content; and performs a zoom operation, based on the zoom factor, whereby the object causing the partial occlusion of the first image capturing device is removed from subsequently received image content.

According to a second described aspect of the disclosure, there is provided a method that includes activating, by at least one processor of an electronic device, a first image capturing device having a first field of view (FOV) and that produces first image content. The method includes in response to detecting a partial occlusion of the first image capturing device by an object, while the first image capturing device is receiving first image content: determining a zoom factor sufficient to remove the object from the received first image content; and performing a zoom operation, based on the zoom factor, whereby the object causing the partial occlusion of the first image capturing device is removed from subsequently received image content.

According to a third described aspect of the disclosure, there is provided a computer program product comprising a non-transitory computer readable medium having program instructions that when executed by a processor of an electronic device that includes a first image capturing device having a first field of view (FOV) and that produces first image content and a controller communicatively coupled to the first image capturing device, configures the electronic device to perform the functions of the above method processes.

The above descriptions contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

Each of the above and below described features and functions of the various different aspects, which are presented as operations performed by the processor(s) of the electronic/communication/computing devices and/or performed by the electronic/communication/computing device are also described as features and functions provided by a plurality of corresponding methods and computer program products, within the various different embodiments presented herein. In the embodiments presented as computer program products, the computer program product includes a non-transitory computer readable storage device having program instructions or code stored thereon, which enables the communication device and/or electronic device to complete the functionality of a respective one of the above-described processes when the program instructions or code are processed by at least one processor of the corresponding electronic/communication device, such as is described above.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one implementation (embodiment) of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not for other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the numbered terms first, second, etc. do not denote any order or importance, but rather the terms first, second, etc. are used to distinguish one element (e.g., a person or a device) from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within communication device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures and beginning with FIG. 1, there is illustrated an example component makeup of communication (electronic) device 100, with specific components used to enable the device to operate in a mode to automatically reduce object interference in a camera system, and within which various aspects of the disclosure can be implemented, according to one or more embodiments.

Examples of communication device 100 include, but are not limited to, mobile devices, a notebook computer, a mobile phone, a smart phone, a digital camera with enhanced processing capabilities, a smart watch, a tablet computer, and other types of electronic devices that include one or more cameras. It is appreciated that communication device 100 can be other types of communication devices that also allow receiving and transmitting of communications in addition to the image capturing features.

Communication device 100 includes processor 102 (typically as a part of a processor integrated circuit (IC) chip), which includes processor resources such as central processing unit (CPU) 103a, communication signal processing resources such as digital signal processor (DSP) 103b, and graphics processing unit (GPU) 103c. Processor 102 can, in some embodiments, include high quality camera image signal processors (ISPs) (not shown) and dedicated artificial intelligence (AI) engines 105. Collectively, processor 102 supports computing, classifying, processing, transmitting and receiving of data and information, and presenting of graphical images within a display. Processor 102 is communicatively coupled to storage device 104, system memory 120, input devices (introduced below), output devices, including integrated displays 130A and 130B, and image capture device (ICD) controller 134. According to one or more embodiments, ICD controller 134 performs or supports functions such as, but not limited to, selecting and activating an active camera from among multiple cameras and adjusting the camera settings and characteristics (e.g., shutter speed, f/stop, ISO exposure, zoom control, field of view (FOV) angle, etc.) of the active camera.

In one or more embodiments, the functionality of ICD controller 134 is incorporated within processor 102, eliminating the need for a separate ICD controller. Thus, for simplicity in describing the features presented herein, the various camera selection, activation, and configuration functions performed by the ICD controller 134 are described as being provided generally by processor 102. Similarly, manipulation of captured images and videos are typically performed by GPU 103c and certain aspects of device communication via wireless networks are performed by DSP 103b, with support from CPU 103a. However, for simplicity in describing the features of the disclosure, the functionality provided by one or more of CPU 103a, DSP 103b, GPU 103c, and ICD controller 134 are collectively described as being performed by processor 102.

Throughout the disclosure, the term image capturing device (ICD) is utilized interchangeably to be synonymous with and/or refer to any one of front or rear facing cameras 132, 133. Front facing cameras 132 and rear facing cameras 133 are communicatively coupled to ICD controller 134, which is communicatively coupled to processor 102. Both sets of cameras 132, 133 include image sensors that can capture images that are within the field of view (FOV) of the respective ICD 132, 133. Communication device 100 can include multiple cameras having different functionality, such as a main camera capturing standard view, wide angle camera that captures a wide angle FOV, and telephoto ICD, which captures a telephoto FOV (zoom or magnified). In one or more embodiments, a single camera can be provided with camera control options to change the single camera lens to allow for wide angle and telephoto image capture. In one or more embodiments, one or more of the ICDs may be used for performing user identification via facial recognition.

System memory 120 may be a combination of volatile and non-volatile memory, such as random-access memory (RAM) and read-only memory (ROM). System memory 120 can store program code or similar data associated with firmware 122, an operating system 124, and/or applications 126. During device operation, processor 102 processes program code of the various applications, modules, OS, and firmware, that are stored in system memory 120.

In accordance with one or more embodiments, applications 126 include, without limitation, general purpose applications 152, 153, and 154, occlusion detection module 155, and communication module 156. Each module and/or application provides program instructions/code that are processed by processor 102 to cause processor 102 and/or other components of communication device 100 to perform specific operations, as described herein. Descriptive names assigned to these modules add no functionality and are provided solely to identify the underlying features performed by processing of the different modules. For example, occlusion detection module 155 can include program code to cause processor 102/ICD controller 134 to compute a zoom factor, and cause ICD controller to use the zoom factor that was computed to perform a zoom operation on the corresponding camera, such that a partial occlusion is omitted from subsequent image content.

Communication module 156 within system memory 120 enables communication device 100 to communicate with wireless communication network 137 and with other devices, such as remote communication device 177 and/or other Internet-connected devices, via one or more of audio, text, and video communications. Communication module 156 can support various communication sessions by communication device 100, such as audio communication sessions, video communication sessions, text communication sessions, receiving notifications, exchange of data, and/or a combined audio/text/video/data communication session.

In one or more embodiments, communication device 100 includes removable storage device (RSD) 136, which is inserted into RSD interface 138 that is communicatively coupled via system interlink to processor 102. In one or more embodiments, RSD 136 is a non-transitory computer program product or computer readable storage device. RSD 136 may have a version of one or more of the applications (e.g., 152, 153, 154, 156) stored thereon. Processor 102 can access RSD 136 to provision communication device 100 with program code that, when executed/processed by processor 102, the program code causes or configures processor 102 and/or generally communication device 100, to provide the various functions of detecting and removing a partial occlusion as described herein. The RSD 136 can be an example of a non-transitory or tangible computer readable storage device.

Communication device 100 includes integrated front and rear displays 130A-130B which can both incorporate tactile, touch screen interface 131A-131B that can receive user tactile/touch input. As a touch screen device, integrated displays 130A-130B allow a user to provide input to or to control communication device 100 by touching features within the user interface presented on integrated displays 130A-130B. Tactile, touch screen interfaces 131A-131B can be utilized as input devices. The touch screen interfaces 131A-131B can each include one or more virtual buttons, indicated generally as 114a and 114b. In one or more embodiments, when a user applies a finger on one of touch screen interfaces 131A-131B in the region demarked by the virtual button 114a and/or 114b, the touch of the region causes the processor 102 to execute code to implement a function associated with the virtual button. Some embodiments can include a display screen on the same surface of the electronic device as the first image capturing device and the second image capturing device. In one or more embodiments, the controller is configured to render image content from at least one of the first image capturing device or the second image capturing device. Accordingly, the display screen that is on the same surface as the first and second image capturing devices is convenient to use when taking self-photos. In some implementations, integrated display 130A is a primary display that is integrated into a front surface of communication device 100, while the higher quality ICDs are located on a rear surface with rear display 130B. The specific physical and functional characteristics of integrated displays 130A-130B, e.g., screen size, aspect ratio, supported resolution, image quality, video display rate, etc., can vary and are known to or accessible by the processor 102.

Communication device 100 also includes a physical interface 165a. Physical interface 165a of communication device 100 can serve as a data port and can be coupled to charging circuitry 135 and device battery 143 to enable recharging of device battery 143.

Communication device 100 can further include microphone 108, one or more output devices such as speakers 144, and one or more input buttons 107a-107n. Microphone 108 can also be referred to as an audio input device. In some embodiments, microphone 108 may be used for identifying a user via voiceprint, voice recognition, and/or other suitable techniques. Input buttons 107a-107n may provide controls for volume, power, and ICDs 132, 133. Additionally, communication device 100 can include input sensors 109 (e.g., sensors enabling gesture detection by a user).

Communication device 100 further includes haptic touch controls 145, vibration device 146, fingerprint/biometric sensor 147, global positioning system (GPS) device 160, and motion sensor(s) 162. Vibration device 146 can cause communication device 100 to vibrate or shake when activated. Vibration device 146 can be activated during an incoming call or message in order to provide an alert or notification to a user of communication device 100. According to one aspect of the disclosure, integrated displays 130A and 130B, speakers 144, and vibration device 146 can generally and collectively be referred to as output devices.

Biometric sensor 147 can be used to read/receive biometric data, such as fingerprints, to identify or authenticate a user, and in some embodiments, the biometric sensor 147 can supplement an ICD (camera) for user detection/identification.

GPS device 160 can provide time data and location data about the physical location of communication device 100 using geospatial input received from GPS satellites. Motion sensor(s) 162 can include one or more accelerometers 163 and gyroscope 164. Motion sensor(s) 162 can detect movement of communication device 100 and provide motion data to processor 102 indicating the spatial orientation and movement of communication device 100. Accelerometers 163 measure linear acceleration of movement of communication device 100 in multiple axes (X, Y and Z). Gyroscope 164 measures rotation or angular rotational velocity of communication device 100. Communication device 100 further includes a housing 190 that is external to and contains/protects the components internal to communication device 100.

Communication device 100 further includes wireless communication subsystem (WCS) 142, which can represent one or more front end devices (not shown) that are each coupled to one or more antennas 148. In one or more embodiments, WCS 142 can include a communication module with one or more baseband processors or digital signal processors, one or more modems, and a radio frequency (RF) front end having one or more transmitters and one or more receivers. WCS 142 and antennas 148 allow communication device 100 to communicate wirelessly with a wireless communication network 137 via transmissions of communication signals to and from network communication devices, such as base stations or cellular nodes, of wireless communication network 137. Wireless communication network 137 further allows communication device 100 to wirelessly communicate with remote communication device 177, which can be similarly connected to wireless communication network 137. In one or more embodiments, wireless communication network 137 can be interconnected with a wide area network that can include one or more devices that support exchange of audio and video messages, data, and/or other communication between communication device 100 and remote communication device 177.

Wireless interface 165*b* can be a short-range wireless communication component providing Bluetooth, near field communication (NFC), and/or wireless fidelity (Wi-Fi) connections. In one embodiment, communication device 100 can receive Internet or Wi-Fi based calls via wireless interface 165*b*. In one embodiment, communication device 100 can communicate wirelessly with external wireless transceiver device 166, such as a WiFi router or BT transceiver, via wireless interface 165*b*. In an embodiment, WCS 142, antenna(s) 148, and wireless interface 165*b* collectively provide communication interface(s) of communication device 100.

FIG. 2A is a diagram illustrating a first surface 202 of an example electronic device, configured as a flip phone with a display and cameras integrated within a top housing portion of the device 200, according to one or more embodiments. Communication device 200 can be a smartphone, tablet computer, or other electronic device. The communication device 200 can be an implementation of communication device 100 (FIG. 1) having the same or similar components and providing the same or similar functions as communication device 100. In one or more embodiments, the first surface 202 is located on a rear portion of device housing and may be referred to as a 'rear surface' of the communication device 200. Communication device 200 includes a foldable region 204. The foldable region 204 may include a specialized hinge mechanism that allows the device to fold and unfold smoothly without putting undue stress on electronic displays and/or other components. First surface 202 includes a first housing portion 252 and a second housing portion 254. Disposed on the first surface at first housing portion 252 are lens 212, corresponding to a first image capturing device, and lens 214, corresponding to a second image capturing device. An electronic display 220 is disposed proximal to the first lens 212 and second lens 214. In one or more embodiments, as illustrated in FIG. 2A, the first lens 212 and second lens 214 are disposed within an area of the electronic display 220. The first lens 212 can differ from the second lens 214 in terms of field of view (FOV). In one or more configurations, the electronic display 220 can be used to display information to a user such as a current time and date, and/or a notification of new messages, such as depicted at 222. Other icons and/or information may be rendered instead of, or in addition to, the information shown on electronic display 220 in FIG. 2A. The illustrative embodiments thus include a display screen on the same surface of the electronic device as the first image capturing device and the second image capturing device. The device controller is configured to render image content from at least one of the first image capturing device or the second image capturing device on the electronic display 220.

FIG. 2B is a diagram illustrating a second surface 232 of the example communication device 200 of FIG. 2A, according to one or more embodiments. In one or more embodiments, the second surface 232 may be referred to as a 'front surface' of the communication device 200. Disposed on the second surface are a foldable electronic display 234, and a front-facing camera lens 240, which can be used for taking self-photos or self-videos or engaging in a video call. Foldable electronic display 234 of communication device 200 can render a variety of application icons that correspond to applications, indicated as 238*a*-238*d*. The applications can include media players, games, messaging applications, and more. The foldable electronic display 234 includes a foldable region 236. In one or more embodiments, the foldable electronic display 234 includes layers of thin, flexible, materials, such as plastic, and/or an organic light-emitting diode (OLED) display that can flex without damage. When the device 200 is folded, the display is folded using a hinge mechanism at foldable region 236 that enables the display to be folded without damage.

Figure 3A:
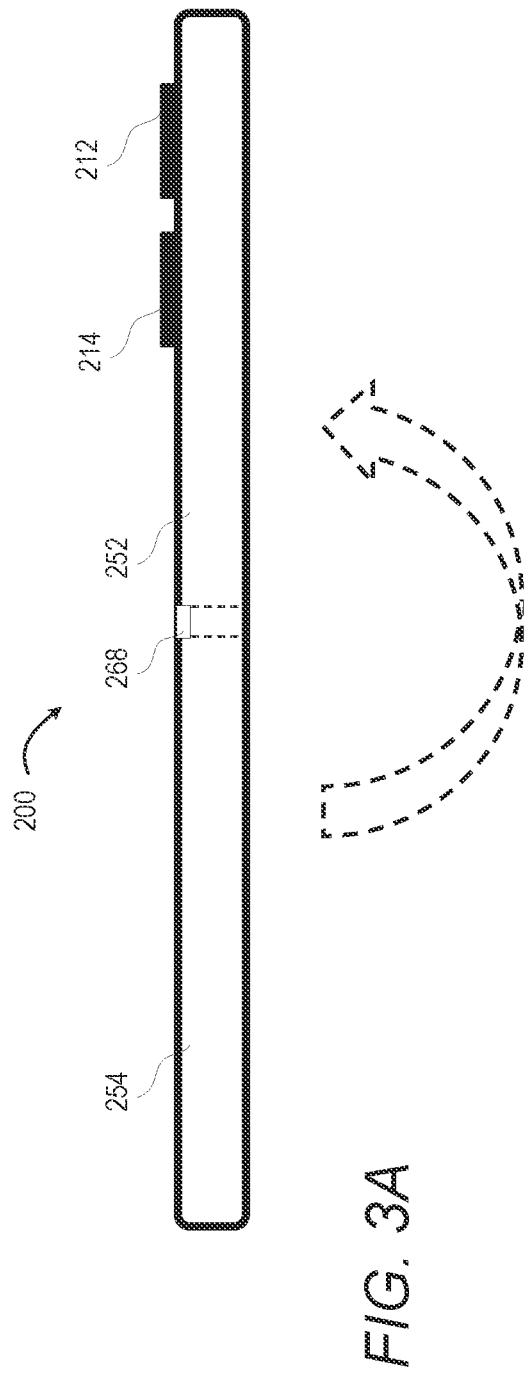
FIG. 3A is a diagram illustrating a side view of the example electronic device of FIG. 2A, in an open configuration with the two cameras disposed on the first surface, according to one or more embodiments.

FIG. 3A is a diagram illustrating a side elevation view of the example communication device 200 of FIG. 2A, in an open configuration, according to one or more embodiments. As can be seen in FIG. 3A, the communication device 200 is in an open (unfolded) position. Communication device 200 includes a first housing portion 252 and a second housing portion 254, and a hinge mechanism 268 disposed between the first housing portion 252 and the second housing portion 254, enabling the electronic device 200 to be moved between an open position and a folded position. The first lens and the second lens are both located within the first housing.

Figure 3B:
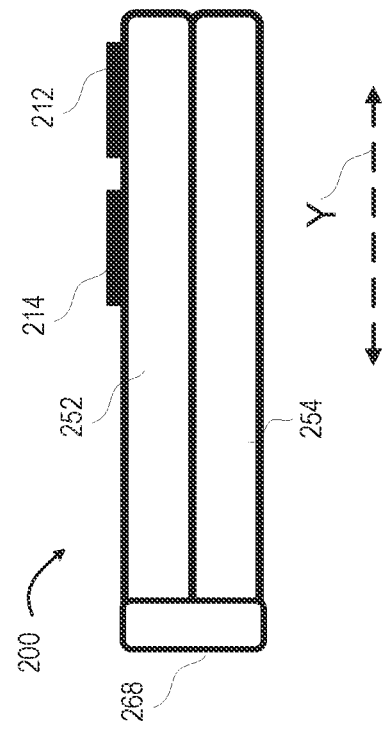
FIG. 3B is a diagram illustrating a side view of the example electronic device of FIG. 3A, in a folded configuration, according to one or more embodiments.

FIG. 3B is a diagram illustrating a side elevation view of the example communication device 200 of FIG. 2A, in a folded (closed) configuration, according to one or more embodiments. As shown in FIG. 3B, second housing portion 254 is folded such that it is in contact with the first housing portion 252 along dimension Y. This provides a folded compact configuration such that when the electronic device is held by a user in the folded position, the first lens and the second lens are reachable by a finger of the user.

Figure 4:
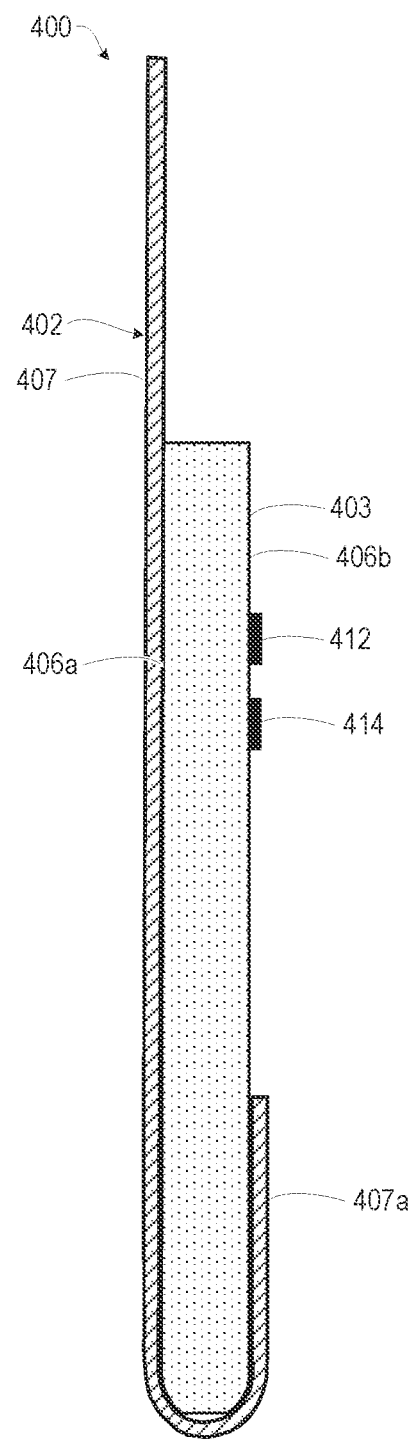
FIG. 4 is a diagram illustrating a side view of a different example electronic device with a flexible scrollable display and multiple image-capturing devices, according to one or more embodiments.

FIG. 4 is a diagram illustrating a side view of a communication device with a flexible scrollable display and multiple image-capturing devices disposed on a rear surface of the communication device, according to one or more embodiments. According to aspects of the present disclosure, communication device 400 includes blade assembly 402 slidably coupled to device housing 403 and carrying flexible display 407. Communication device 400 includes a mechanism operable to slide blade assembly 402 relative to device housing 403 between an extended position and a retracted position. In the retracted position, more of blade assembly 402 is rolled onto back side 406*b* of housing 403. In the extended position, more of blade assembly 402 is rolled onto front side 406*a* to extend beyond an opposite edge of housing 403. In embodiments, the communication device 400 may be referred to as a 'scrollable display device.'

A portion of the flexible display, indicated as 407*a*, is disposed on the same surface as lens 412, corresponding to a first image capturing device, and lens 414, corresponding to a second image capturing device. Accordingly, in one or more embodiments, a communication device with a scrollable display such as shown in FIG. 4 also supports being configured to reduce object interference in a multi-camera system.

Figure 5:
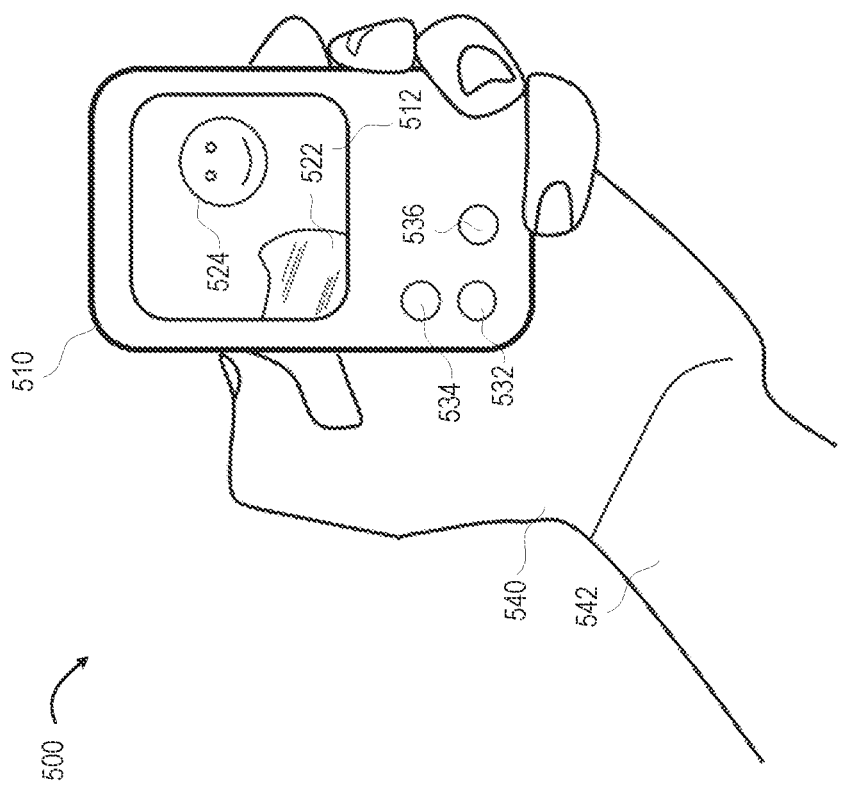
FIG. 5 is a diagram illustrating an example of a partial occlusion within a preview image from a body part of a user taking a self-photo, according to one or more embodiments.

FIG. 5 is a diagram 500 illustrating a side view of a different example electronic device with a flexible display and multiple image-capturing devices, according to one or more embodiments. As shown in FIG. 5, an electronic device 510 is being held in a hand 542 of a user. The electronic device 510 can be an implementation of communication device 100 (FIG. 1) having the same or similar components and providing the same or similar functions as communication device 100. The electronic device 510 is in a folded configuration, such as shown in FIG. 3B. The electronic device 510 can have multiple rear-facing cameras, which when in a folded configuration, can be conveniently used for self-photos. As shown in FIG. 5, electronic device 510 has three cameras, indicated as 532, 534, and 536. In one or more embodiments, each camera can have a different FOV. As an example, a first camera 532 can be a portrait camera, a second camera 534 can be a wide-angle camera, and a third camera 536 can be an ultra-wide-angle camera. The electronic device 510 is being held in the hand 540 of a user, such that the user's face 524 is rendered on electronic display 512, along with a partial occlusion 522, which can include a portion of the user's hand 540, and/or the user's arm 542 that is being used to hold the electronic device. In general, the partial occlusion 522 is undesirable to include in a self-photo. Disclosed embodiments automatically remove the partial occlusion by triggering a lens of the active camera to zoom in on a subject of interest, such as the user's face 524. The amount of zoom that occurs is based on a zoom factor computed by the processor of the electronic device 510 such that the zooming sufficient to remove the partial occlusion 522 from subsequent image content.

One or more embodiments of the disclosure can include a display screen on a same surface of the electronic device as the first image capturing device and the first image content is of a device user who is holding the electronic device to take a self-photo. In one or more embodiments, the enclosure comprises a first housing and a second housing. The electronic device further includes a hinge mechanism disposed between the first housing and the second housing, enabling the electronic device to be transformed between an open configuration and a closed configuration. The first image capturing device and the second image capturing device are both located within the first housing, such that when the electronic device is held by a user in the closed configuration, a portion of a hand of a user that is holding the electronic device is within a field of view of at least one of the first image capturing device and the second image capturing device.

Figure 6:
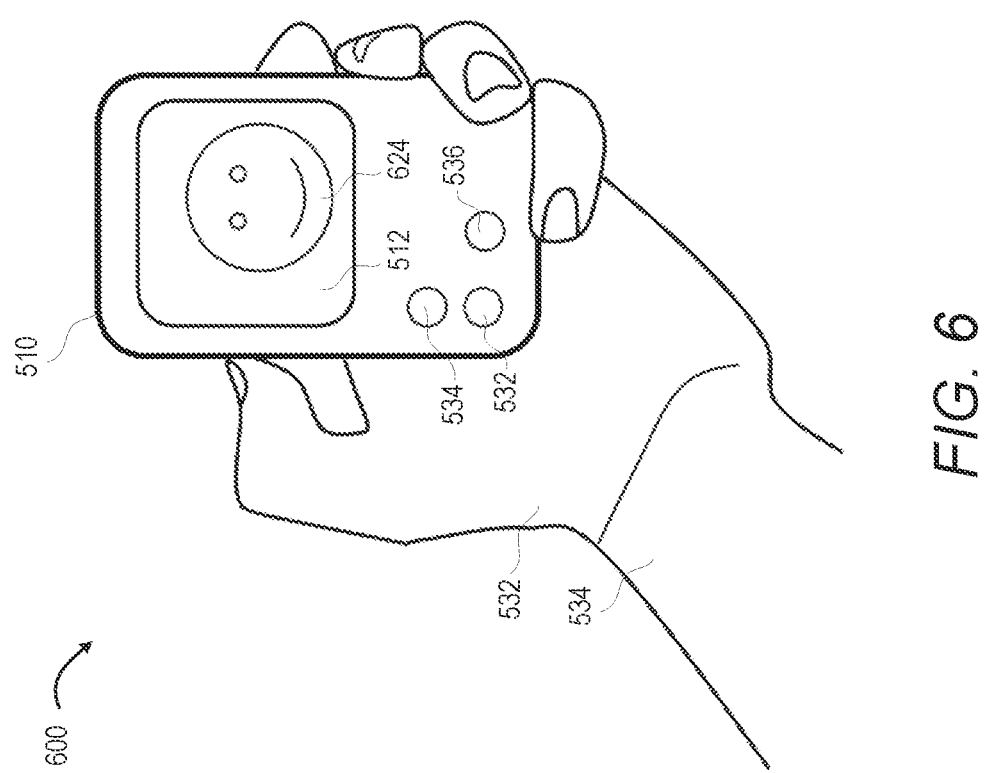
FIG. 6 is a diagram illustrating an example of an adjustment made to the self-photo capturing process of FIG. 5 to remove the partial occlusion from the image, according to one or more embodiments.

FIG. 6 is a diagram 600 illustrating an example including removal of a partial occlusion within a preview image from a body part of a user taking a self-photo, according to one or more embodiments. As shown in FIG. 6, device 510 is rendering the user's face 624 in a zoomed-in mode, such that the image content shown in FIG. 6, is zoomed in sufficiently to exclude the partial occlusion (522 of FIG. 5). In one or more alternate embodiments, the device 510 may switch the active image capturing device in order to perform the zoom functions. Since users often want to include background in their self-photos, disclosed embodiments can compute a zoom function that is sufficient to remove a partial occlusion, but without excessively zooming in, to preserve as much background as possible in the FOV of the active image capturing device. In one or more embodiments, the controller within device 510 incrementally increases the zoom factor until the partial occlusion (e.g., 522 of FIG. 5) is no longer detected in the image content (such as shown in FIG. 6).

In one or more embodiments, the first image capturing device includes a wide-angle image capturing device, and the second image capturing device has a narrower FOV than the first image capturing device. To perform the multi-camera zoom operation, the controller: determines whether the object is present in the second image content; and sets the second image capturing device as an active image capturing device among the first and second image capturing devices, in response to the object not being present in the second image content. In one or more embodiments, the at least one image capturing device includes the first image capturing device and a second image capturing device having a second FOV that differs from the first FOV and that produces second image content, where the first image capturing device and the second image capturing device are disposed on a same surface of the electronic device. To perform the zoom operation, the controller performs a multi-camera zoom operation, based on the zoom factor, whereby the object causing the partial occlusion of the first image capturing device is removed from subsequently received first image content. Embodiments can include initially rendering the partial occlusion on the display screen and subsequently rendering a zoomed-in view of the first image content without the partial occlusion. According to one or more embodiments rendering the first image content on the display screen includes: initially rendering the partial occlusion on the display screen; and subsequently rendering a zoomed-in view of the first image content without the partial occlusion.

Figure 7:
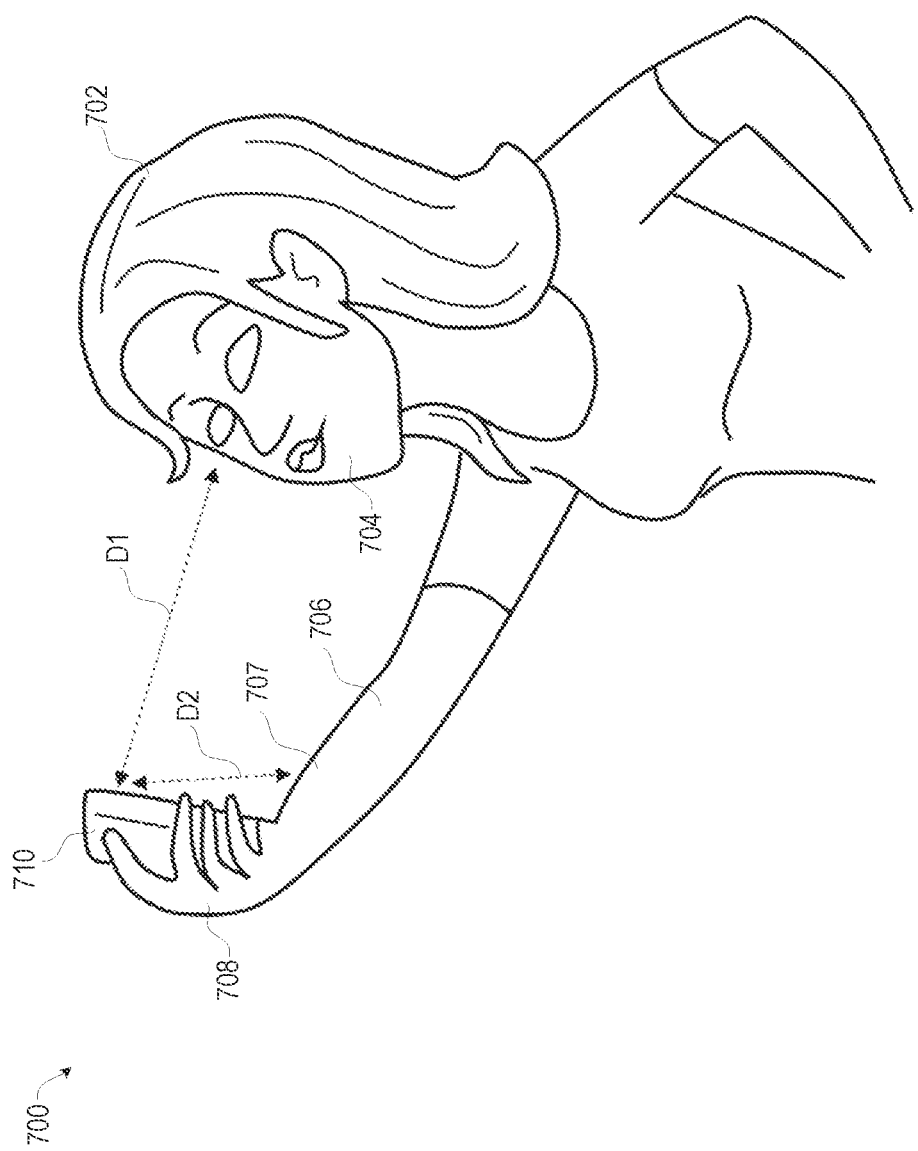
FIG. 7 is a diagram illustrating a user taking a self-photograph, according to one or more embodiments where a part of the user's hand or arm can present an occlusion within the camera-captured image, in accordance with one or more embodiments.

FIG. 7 is a diagram 700 illustrating a user 702 taking a self-photograph, according to one or more embodiments. User 702 holds electronic device 710 in her hand 708 with her arm 706 extended, with the electronic device 710 oriented such that an image capturing device captures image content that includes the face 704 of the user 702. The electronic device 710 can be an implementation of communication device 100 (FIG. 1) having the same or similar components and providing the same or similar functions as communication device 100. The arm 706 of the user 702 is extended such that the electronic device 710 is at a distance D1 from the face 704 of the user 702. The distance D1 depends on the size of the user and how far the user extends his/her arm while taking a self-photo. In some embodiments, the distance D1 is a value ranging from 40 centimeters to 65 centimeters.

In the case of an ultra-wide-angle camera, the captured image content may also include a distal portion 707 of arm 706. The distal portion 707 is at a lateral distance D2 from the electronic device 710, where D2<D1. In some embodiments, the distance D2 is a value ranging from 10 to 15 centimeters. In one or more embodiments, the distance from the image capturing device is used as criteria for determining if an object in the image content is a partial occlusion. In embodiments, a ranging operation is performed to determine a distance. In one or more embodiments, an active autofocus system, such as a laser autofocus system is used for determining distance.

In one or more embodiments, to perform a zoom operation, the controller: performs a ranging operation on the object; determines, based on the ranging operation, a distance between the object and the first image capturing device; and in response to the distance being less than a predetermined value, determines the zoom factor based on the distance. In other embodiments, a phase-detection autofocus system is used, and by determining a focus setting in which the object is in focus, a distance from the camera to that object can be computed based on lens focal length, distance between a lens and a corresponding image sensor, and/or other criteria. In other embodiments, a contrast-detection autofocus system is used, and by determining a focus setting in which the object is at a point of maximum contrast, the object is deemed to be in focus. Then, from the lens configuration at the point of maximum contrast of the object, a distance from the camera to that object can be computed based on lens focal length, distance between a lens and a corresponding image sensor, and/or other criteria. A similar ranging operation can be performed on distal portion 707, if distal portion 707 is in the FOV of the camera, which can occur with an ultra-wide-angle camera. In one or more embodiments, determining if an object is a partial occlusion is based on distance. In one or more embodiments, other criteria, such as the location of the object within the FOV are also factors used in identification of a partial occlusion. In one or more embodiments, objects that are located within a peripheral region and have a distance less than a predetermined threshold, are deemed as partial occlusions and may be candidates for removal or minimization. In one or more embodiments, the partial occlusions may be partially removed, by computing a zoom factor that removes as much of the partial occlusion as possible, while still preserving a second object. The second object, referred to as a subject object, is an object that is intended to be preserved in a self-photograph.

Referring again to FIG. 7, the controller of device 710 can be configured to identify face 704 as a subject object. In one or more embodiments, the zoom factor is computed such that the subject object is preserved, while removing as much as possible of the partial occlusion through zooming, cropping, selecting a subset of image content, and/or other suitable techniques. In one or more embodiments, user-configurable options are provided in which the user can specify preferences such as prioritizing removal of the partial occlusion or preserving the subject object. Embodiments can include performing a ranging operation on the object and determining, based on the ranging operation, a distance between the object and the first image capturing device. The embodiments further include in response to the distance being less than a predetermined value, determining the zoom factor based on the determined distance.

Figure 8:
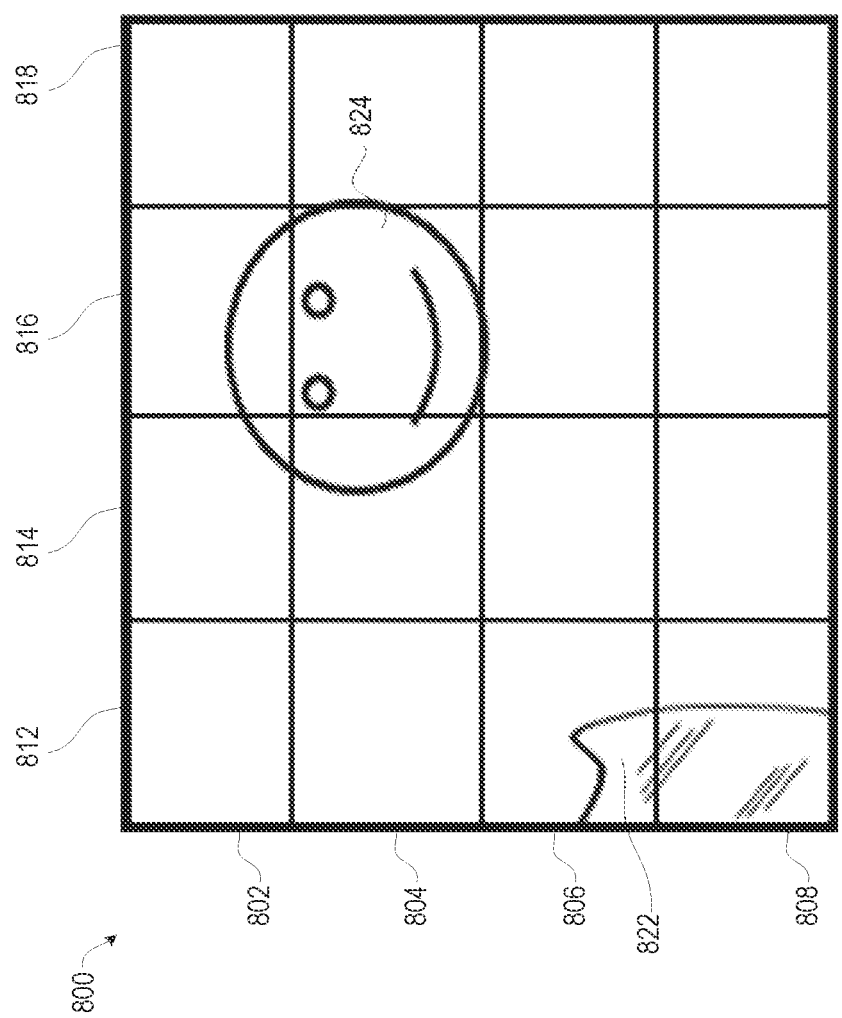
FIG. 8 depicts a graph illustrating an occlusion in a peripheral region of a preview image, according to one or more embodiments.

FIG. 8 depicts a graph 800 illustrating an occlusion in a peripheral region, according to one or more embodiments. Graph 800 includes an image of a subject object 824, which in this example, is a human face. In one or more embodiments, face identification techniques such as cascade classifiers, and/or other suitable techniques can be used to identify one or more human faces within captured image content. Graph 800 also includes a partial occlusion 822. The partial occlusion can include a portion of a hand and/or arm of a user that is holding an electronic device at arm's length for the purpose of taking a self-photo. With an ultra-wide-angle lens, for example, the image content can include a portion of the user's hand and/or arm, which is generally undesirable. In one or more embodiments, the image content may be divided into a grid system. The grid system includes a plurality of columns, indicated as 812, 814, 816, and 818, and a plurality of rows, indicated as 802, 804, 806, and 808. While the graph 800 shows a 4×4 grid, thereby containing 16 separate sub-regions, in practice, there can be many more rows and columns used for subdividing image content. In one or more embodiments, outer subregions, such as those in column 812, and also in row 808, are regions which may be deemed as peripheral regions. The zoom factor can be computed such that partial occlusions in peripheral regions are removed from subsequent image content. In one or more embodiments, to detect the partial occlusion, the controller: detects a position of an object at a peripheral region of the first FOV; and identifies that light captured by the first image capturing device has a color that is indicative of placement of a human body part substantially close to a lens of the first image capturing device. In the presented example, the processor zooms in on the subject object 824, such that column 812 is removed from the presented zoomed-in image, which is then presented as similar to the resulting image shown by FIG. 6.

Figure 9:
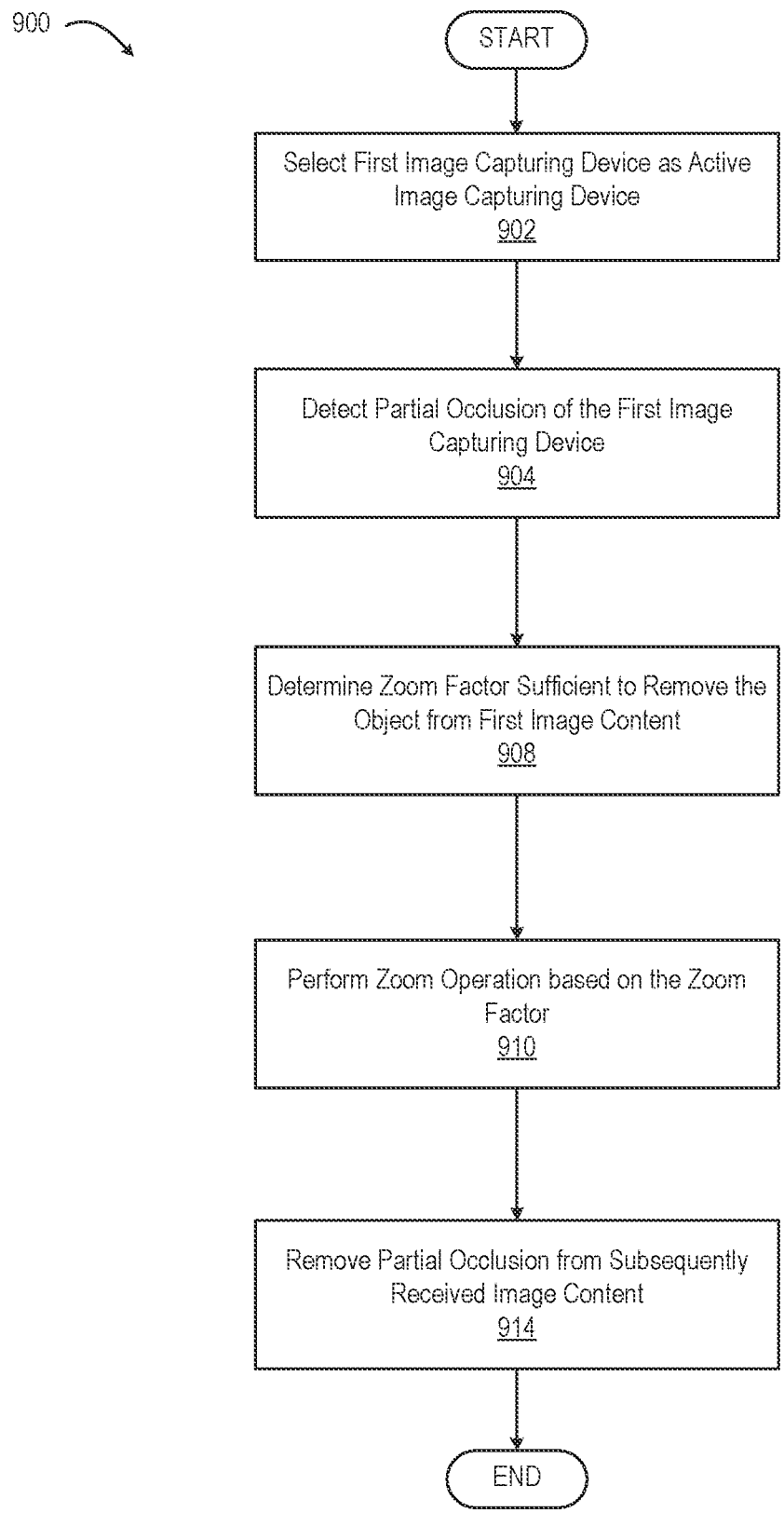
FIG. 9 depicts a flowchart of a method by which an electronic device enables removal of an occlusion from an image being captured by a multi-camera system, according to one or more embodiments.

Referring now to the FIG. 9, which provides a flow diagram presenting an embodiment of a method 900 performed by an electronic device to enable reducing object interference in a camera system, according to one or more embodiments. The descriptions of method 900 depicted in FIG. 9 are provided with general reference to the specific components and/or features illustrated within the preceding FIGS. 1-8. The operations depicted in FIG. 9 can be performed by electronic device 100 or any suitable electronic device that includes front and/or rear cameras that support a zoom function involving the single camera or a multi-camera zoom function provided by at least two cameras having different field of views. One or more of the processes of the methods described in FIG. 9 may be performed by processor 102 executing program code associated with occlusion detection module 155.

The method 900 transitions from the start block to block 902 at which the method 900 includes selecting an image capturing device as an active image capturing device to for capturing a self-photo. In one or more embodiments, the selecting of an image capturing device can be based on input received at a user interface, such as shown at 131A or 131B of FIG. 1. In one or more embodiments, a default image capturing device, such as an ultra-wide-angle camera, may be automatically selected by the controller. The method 900 continues to block 904, where a partial occlusion of the first image capturing device is detected. The partial occlusion can be detected based on a variety of criteria, including, but not limited to, distance, location, focus, and/or color range. In embodiments, objects within a certain distance from an image capturing device are deemed to be partial occlusions. As an example, objects less than 12 centimeters from the image capturing device can be deemed to be partial occlusions. In one or more embodiments, an additional criterion of location within a FOV of the image capturing device is also considered. In such embodiments, objects located in a peripheral region of the captured image content may be deemed as partial occlusions. In one or more embodiments, focus is an additional criterion used to evaluate a partial occlusion. In such embodiments, objects in peripheral regions that cannot be brought into focus (i.e., because the objects are too close to the lens) are deemed to be partial occlusions. In one or more embodiments, a color range is an additional criterion that is used to evaluate a partial occlusion. In one or more embodiments, to detect the partial occlusion, the controller: detects a position of an object, where the position includes a peripheral region of the first FOV; and receives a signal identifying that light captured by the first image capturing device is light comprising a wavelength ranging from 580 nanometers to 630 nanometers. This wavelength range is often indicative of human skin, such as from a palm or arm of a user, and thus, can be used as a criterion for identification of partial occlusions, according to one or more embodiments.

The method 900 continues to block 908, at which the method 900 includes determining a zoom factor that is sufficient to remove the object from first image content. Determining a zoom factor can include determining a zoom factor to remove or minimize a partial occlusion. In one or more embodiments, a minimum zoom factor is computed, in which the minimum zoom factor is the smallest zoom factor that completely removes a partial occlusion. In one or more embodiments, a maximum zoom factor is computed, in which the maximum zoom factor is the largest zoom factor that completely preserves a subject object (e.g., such as a human face).

The method 900 continues to block 910, at which the method 900 includes performing a zoom operation. The zoom operation can include performing digital zoom operations, and/or optical zoom operations. Optical zoom and digital zoom are two types of zoom modes that are commonly found in digital cameras. Optical zoom refers to the physical movement of the camera lens to zoom in or out on a subject. Optical zoom uses the lens elements to adjust the magnification and provide a high-quality, clear image. Digital zoom utilizes image processing software functions to crop and enlarge a portion of the image. This process effectively enlarges a subsection of the original image. In one or more embodiments, digital zoom is achieved by increasing the size of the pixels that make up the image.

In one or more embodiments, to perform the zoom operation, the controller performs a multi-camera zoom operation, based on the zoom factor, whereby the object causing the partial occlusion of the first image capturing device is removed from subsequently received first image content. The multi-camera zoom operation can include switching the active image capturing device to a second image capturing device having a smaller field of view or a field of view that excludes the object. Embodiments can further include performing a realignment operation on image content. The realignment operation can be used to compensate for the difference in position between two image capturing devices. The realignment operation can include re-centering a zoomed-in portion of captured content. As an example, if the controller switches from an ultra-wide-angle image capturing device to a wide-angle image capturing device that is offset by one centimeter from the ultra-wide-angle image capturing device, then the realignment operation can enable a more seamless transition between the two image capturing devices by shifting the image content from the wide-angle image capturing device to maintain the relative position of objects within the display as the image content transitions from the ultra-wide-angle image capturing device to the wide-angle image capturing device. Other techniques, such as folded optics and/or moveable mirrors may also be used to synthesize images from multiple image capturing devices in one or more embodiments.

The method 900 continues to block 914, at which the method 900 includes removing the partial occlusion. Through zoom operations, including optical zoom operations and/or digital zoom operations, partial occlusions, such as a portion of a palm, fingers, wrist, and/or arm of a user that is extending his/her arm out for the purposes of taking a self-photo (see FIG. 7) are removed. Disclosed embodiments remove the partial occlusion, such as indicated at FIG. 5, as compared with the original preview image of FIG. 4, which shows the partial occlusion.

As can now be appreciated, disclosed embodiments reduce or removes partial occlusions such as fingers and hands of a user that can appear when the user's body part partially obscures a part of the field of view of the camera, such as an ultra-wide-angle camera, being used for taking a self-photo. This feature greatly improves the user-experience of taking self-photos. The activity of taking self-photos is extremely popular with users. People enjoy taking self-photos to document occasions spent with groups of friends and family, as well documenting travels and obtain photos of themselves in various locations, with landmarks and/or scenery in the background. To accomplish these goals, an ultra-wide-angle camera is well suited for such photographs. However, the ultra-wide-angle camera has the adverse tendency to include a portion of the user's hand and/or arm in a self-photo. The features provided by the disclosed embodiments can mitigate this problem, and therefore improve the overall customer satisfaction when taking self-photos with electronic devices such as smartphones. Thus, disclosed embodiments improve the technical field of photography in an electronic device, such as a smartphone.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
 an enclosure comprising a first surface and a second surface;
 at least one image capturing device comprising a first image capturing device having a first field of view (FOV) and that produces first image content;
 a controller communicatively coupled to the first image capturing device, and which:
  selects the first image capturing device as an active image capturing device;
  in response to detecting a partial occlusion of the first image capturing device by an object, while the first image capturing device is receiving first image content:
   determines a zoom factor sufficient to remove the object from the received first image content; and
   performs a zoom operation, based on the zoom factor, whereby the object causing the partial occlusion of the first image capturing device is removed from subsequently received image content.

2. The electronic device of claim 1, wherein to perform a zoom operation, the controller:
 performs a ranging operation on the object;
 determines, based on the ranging operation, a distance between the object and the first image capturing device; and
 in response to the distance being less than a predetermined value, determines the zoom factor based on the distance.

3. The electronic device of claim 1, wherein to detect the partial occlusion, the controller:
 detects a position of an object at a peripheral region of the first FOV; and
 identifies that light captured by the first image capturing device has a color that is indicative of placement of a human body part substantially close to a lens of the first image capturing device.

4. The electronic device of claim 1, wherein:
 the at least one image capturing device comprises the first image capturing device and a second image capturing device having a second FOV that differs from the first FOV and that produces second image content, wherein the first image capturing device and the second image capturing device are disposed on a same surface of the electronic device; and
 to perform the zoom operation, the controller performs a multi-camera zoom operation, based on the zoom factor, whereby the object causing the partial occlusion of the first image capturing device is removed from subsequently received first image content.

5. The electronic device of claim 4, wherein the first image capturing device comprises a wide-angle image capturing device, and the second image capturing device has a narrower FOV than the first image capturing device, wherein to perform the multi-camera zoom operation, the controller:
 determines whether the object is present in the second image content; and
 sets the second image capturing device as an active image capturing device among the first and second image capturing devices, in response to the object not being present in the second image content.

6. The electronic device of claim 4, wherein the enclosure comprises a first housing and a second housing, and wherein the electronic device further comprises:
 a hinge mechanism disposed between the first housing and the second housing, enabling the electronic device to be transformed between an open configuration and a closed configuration, and wherein the first image capturing device and the second image capturing device are both located within the first housing, such that when the electronic device is held by a user in the closed configuration, a portion of a hand of a user that is holding the electronic device is within a field of view of at least one of the first image capturing device and the second image capturing device.

7. The electronic device of claim 1, further comprising a display screen on a same surface of the electronic device as the first image capturing device and the first image content is of a device user who is holding the electronic device to take a self-photo.

8. A method comprising:
selecting, by at least one processor of an electronic device, a first image capturing device having a first field of view (FOV) and that produces first image content;
in response to detecting a partial occlusion of the first image capturing device by an object, while the first image capturing device is receiving first image content:
determining a zoom factor sufficient to remove the object from the received first image content; and
performing a zoom operation, based on the zoom factor, whereby the object causing the partial occlusion of the first image capturing device is removed from subsequently received image content.

9. The method of claim 8, further comprising:
performing a ranging operation on the object;
determining, based on the ranging operation, a distance between the object and the first image capturing device; and
in response to the distance being less than a predetermined value, determining the zoom factor based on the distance.

10. The method of claim 8, further comprising:
detecting a position of an object at a peripheral region of the first FOV; and
identifying that light captured by the first image capturing device has a color that is indicative of placement of a human body part substantially close to a lens of the first image capturing device.

11. The method of claim 8, wherein the at least one image capturing device comprises the first image capturing device and a second image capturing device having a second FOV that differs from the first FOV and that produces second image content, wherein the first image capturing device and the second image capturing device are disposed on a same surface of the electronic device, and wherein performing the zoom operation further comprises performing a multi-camera zoom operation, based on the zoom factor, whereby the object causing the partial occlusion of the first image capturing device is removed from subsequently received first image content.

12. The method of claim 11, wherein:
the first image capturing device comprises a wide-angle image capturing device, and the second image capturing device has a narrower FOV than the first image capturing device; and
to perform the multi-camera zoom operation, the method further comprises:
determining whether the object is present in the second image content; and
setting the second image capturing device as an active image capturing device among the first and second image capturing devices, in response to the object not being present in the second image content.

13. The method of claim 8, wherein the electronic device further comprises a display screen on a same surface of the electronic device as the first image capturing device and the first image content is of a device user who is holding the electronic device to take a self-photo, the method further comprising rendering the first image content on the display screen.

14. The method of claim 13, wherein rendering the first image content on the display screen comprises: initially rendering the partial occlusion on the display screen; and subsequently rendering a zoomed-in view of the first image content without the partial occlusion.

15. A computer program product comprising a non-transitory computer readable medium having program instructions that when executed by a processor of an electronic device that comprises at least one image capturing device comprising a first image capturing device having a first field of view (FOV) and that produces first image content and a controller communicatively coupled to the first image capturing device, configures the electronic device to perform functions comprising:
in response to detecting a partial occlusion of the first image capturing device by an object, while the first image capturing device is receiving first image content:
determining a zoom factor sufficient to remove the object from the received first image content; and
performing a zoom operation, based on the zoom factor, whereby the object causing the partial occlusion of the first image capturing device is removed from subsequently received image content.

16. The computer program product of claim 15, wherein the computer program product further comprises program instructions for:
performing a ranging operation on the object;
determining, based on the ranging operation, a distance between the object and the first image capturing device; and
in response to the distance being less than a predetermined value, determining the zoom factor based on the determined distance.

17. The computer program product of claim 15, wherein the computer program product further comprises program instructions for:
detecting a position of an object at a peripheral region of the first FOV; and
identifying that light captured by the first image capturing device has a color that is indicative of placement of a human body part substantially close to a lens of the first image capturing device.

18. The computer program product of claim 15, wherein the at least one image capturing device comprises the first image capturing device and a second image capturing device having a second FOV that differs from the first FOV and that produces second image content, wherein the first image capturing device and the second image capturing device are disposed on a same surface of the electronic device, and wherein the computer program product further comprises program instructions for performing a multi-camera zoom operation, based on the zoom factor, whereby the object causing the partial occlusion of the first image capturing device is removed from subsequently received first image content.

19. The computer program product of claim 18, wherein the first image capturing device comprises a wide-angle image capturing device, and the second image capturing device has a narrower FOV than the first image capturing device, wherein to perform the multi-camera zoom operation, the computer program product further comprises program instructions for:
determining whether the object is present in the second image content; and setting the second image capturing device as an active image capturing device among the first and second image capturing devices, in response to the object not being present in the second image content.

20. The computer program product of claim 15, wherein the electronic device further comprises a display screen on a same surface of the electronic device as the first image capturing device and the first image content is of a device user who is holding the electronic device to take a self-photo, and wherein the computer program product further comprises program instructions for initially rendering the first image content on the display screen; and subsequently rendering a zoomed-in view of the first image content without the partial occlusion.

* * * * *